United States Patent
Arakawa et al.

(10) Patent No.: US 6,885,020 B2
(45) Date of Patent: Apr. 26, 2005

(54) METHOD AND APPARATUS FOR IMAGE SIGNAL OBTAINMENT

(75) Inventors: Satoshi Arakawa, Kaisei-machi (JP); Hiroaki Yasuda, Kaisei-machi (JP); Hiroyuki Karasawa, Kaisei-machi (JP); Jin Murayama, Miyagi-ken (JP); Tetsuo Yamada, Miyagi-ken (JP); Tatsuya Hagiwara, Miyagi-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 162 days.

(21) Appl. No.: 10/095,458

(22) Filed: Mar. 13, 2002

(65) Prior Publication Data
US 2002/0130282 A1 Sep. 19, 2002

(30) Foreign Application Priority Data
Mar. 14, 2001 (JP) .......................... 2001-071728

(51) Int. Cl.7 .......................... G01N 23/04; H05B 33/00
(52) U.S. Cl. .................. 250/586; 250/484.4; 250/580; 250/584
(58) Field of Search .................. 250/580, 584, 250/586, 484.4

(56) References Cited

U.S. PATENT DOCUMENTS

| 4,258,264 A | | 3/1981 | Kotera et al. |
| 4,346,295 A | | 8/1982 | Tanaka et al. |
| 4,485,302 A | | 11/1984 | Tanaka et al. |
| 5,003,182 A | * | 3/1991 | Umemoto et al. ....... 250/484.4 |
| 5,198,679 A | * | 3/1993 | Katoh et al. .......... 250/484.4 |

FOREIGN PATENT DOCUMENTS

| JP | 55-12429 | 1/1980 |
| JP | 56-11395 | 2/1981 |
| JP | 56-11397 | 2/1981 |

* cited by examiner

Primary Examiner—John R. Lee
Assistant Examiner—Paul M. Gurzo
(74) Attorney, Agent, or Firm—Sughrue Mion, PLLC

(57) ABSTRACT

In the obtainment of image signals by receiving emitted light, generated by a stimulable phosphor sheet due to irradiation thereof by an excitation light, at the light receiving surfaces of photoelectric conversion elements, then obtaining an electrical image signal based on the charges stored in the photoelectric conversion elements by an image signal obtainment means comprising a charge transfer path and an output circuit, the area surrounding the light receiving surfaces of the photoelectric conversion elements have been covered by a filter that absorbs only blue light, and the emitted light is received.

22 Claims, 3 Drawing Sheets

METHOD AND APPARATUS FOR IMAGE SIGNAL OBTAINMENT

BACKGROUND OF THE INVENTION

1. Field of the Invention

The present invention relates to a method and apparatus for image obtainment. More particularly, the present invention relates to a method and apparatus for image obtainment in which light, emitted by a stimulable phosphor sheet due to irradiation thereof by an excitation light, is received.

2. Description of the Related Art

There are known radiation image recordation/reproduction systems in which stimulable phosphors (storable phosphors) that store a portion of radiation energy when irradiation with radiation (X-rays, $\alpha$-rays, $\beta$-rays, $\gamma$-rays, electron beams, ultraviolet rays, etc.) and emit light corresponding to the energy stored therein when irradiated with an excitation light, such as visible light, are utilized (Japanese Unexamined Patent Publication Nos. 55(1980)-12429, 56(1981)-11395, 56(1981)-11397, etc.). These systems temporarily store radiation image information of a subject such as a human body onto a stimulable phosphor sheet composed of stimulable phosphors arranged in a sheet form, scan the stimulable phosphor sheet with an excitation light thereby generating emitted light, read out the obtained emitted light photoelectrically to obtain image signals, then displays the radiation image of the subject as a visible image on recording media such as photosensitive material, or on a display device such as a CRT based on the image signals.

As an apparatus for photoelectrically reading out the aforementioned emitted light and obtaining an image signal, there is known, for example, an apparatus that employs line sensors of a CCD type, having photoelectric conversion elements consisting of photodiodes arranged in a straight line. This line sensor receives emitted light, generated by the stimulable phosphor sheet with the light receiving surfaces of a plurality of photoelectric conversion elements. Electrical image signals are obtained based on the charge stored in each of the photoelectric conversion elements, and a visible image that represents the radiation image information of the subject recorded on the stimulable phosphor sheet is formed based on these electrical image signals.

The aforementioned line sensors are formed with a light absorption layer covered with metallic film for absorbing white light (i.e., red, green, and blue) in the area surrounding the light receiving surfaces thereof (e.g., a charge transfer path or the like). This is to prevent the generation of false images by noise being mixed in with the image signals. The noise may be signals generated by the emitted light reflected or scattered by a region of the line sensor other than the light receiving surfaces, for example, the charge transfer path, entering the light receiving surfaces.

With regard to the aforementioned radiation image recordation/reproduction system, generally the only light that enters the photoelectric conversion element is the emitted light. Other light, for example, excitation light, is cut off by a filter or the like before entering the photoelectric conversion element. As the wavelength range of the emitted light is included in the wavelength range of blue light, there is a desire for a simpler method of preventing reflection and scattering of the emitted light in the area surrounding the photoelectric conversion elements which does not require covering with a filter that absorbs all of the red, green, and blue light.

SUMMARY OF THE INVENTION

The present invention has been developed in view of the aforementioned circumstances, and it is an object of the present invention to provide a method and apparatus for image signal obtainment that prevents the entry of reflected as well as scattered emitted light into the light receiving surfaces of photoelectric conversion elements easily and at low cost.

The method of image signal obtainment according to the present invention is a method of image signal obtainment that receives emitted light, generated by a stimulable phosphor sheet due to irradiation thereof with an excitation light, at light receiving surfaces of photoelectric conversion elements, and obtains electrical image signals based on the charges stored in the photoelectric conversion elements, wherein the area surrounding the light receiving surfaces are covered by a filter that absorbs only the emitted light.

The method of image obtainment according to the present invention is a method of image signal obtainment that receives emitted light, generated by a stimulable phosphor sheet due to irradiation thereof with an excitation light, at light receiving surfaces of photoelectric conversion elements, and obtains electrical image signals based on the charges stored in the photoelectric conversion elements, wherein the area surrounding the light receiving surfaces are covered by a filter that absorbs only blue light.

The apparatus for image signal obtainment according to the present invention comprises photoelectric conversion elements having light receiving surfaces for receiving emitted light, generated by a stimulable phosphor sheet due to irradiation thereof with an excitation light; and an image signal obtainment means for obtaining electrical image signals based on the charges stored in the photoelectric conversion elements; wherein the area surrounding the light receiving surfaces are covered by a filter that absorbs only the emitted light.

The apparatus for image signal obtainment according to the present invention comprises photoelectric conversion elements having light receiving surfaces for receiving emitted light, generated by a stimulable phosphor sheet due to irradiation thereof with an excitation light; and an image signal obtainment means for obtaining electrical image signals based on the charges stored in the photoelectric conversion elements; wherein the area surrounding the light receiving surfaces are covered by a filter that absorbs only blue light.

The apparatus for image signal obtainment is provided with a plurality of photoelectric conversion elements, and the light receiving surfaces of each of the photoelectric conversion elements may be arranged in a straight line.

"The area surrounding the light receiving surfaces" may be a portion of the area surrounding the light receiving surfaces, or it may be the entirety of the area surrounding the light receiving surface.

"A filter that absorbs only blue light" may absorb only the light within a wavelength range that matches that of the emitted light, or absorb only the light within the blue wavelength range that matches at least that of the emitted light, or absorb only the light across the entire blue wavelength range.

The filter may be formed of layered metallic film, or it may be formed by a coating of pigment, paint, or the like.

According to the method and apparatus for image obtainment of the present invention, the area surrounding the light receiving surfaces of photoelectric conversion elements have been covered by a filter that absorbs only the emitted light, in the obtainment of image signals by receiving the emitted light, generated by a stimulable phosphor sheet due to irradiation thereof by an excitation light, at the light receiving surfaces of photoelectric conversion elements, then obtaining an electrical image signal based on the charges stored in the photoelectric conversion elements. Therefore, compared to a case in which a filter that takes into consideration absorption of the emitted light as well as light other than the emitted light covers the area surrounding the light receiving surfaces, the entry of the reflected emitted light as well as the scattered emitted light into the light receiving surfaces is prevented easily, and at low cost.

According to the method and apparatus for image obtainment of the present invention, the area surrounding the light receiving surfaces of photoelectric conversion elements have been covered by a filter that absorbs only blue light, in the obtainment of image signals by receiving emitted light, generated by a stimulable phosphor sheet due to irradiation thereof by an excitation light, at the light receiving surfaces of photoelectric conversion elements, then obtaining an electrical image signal based on the charges stored in the photoelectric conversion elements. Therefore, compared to a case in which a filter that takes into consideration absorption of blue light as well as light other than blue light covers the area surrounding the light receiving surfaces as has been the conventional method, the entry of the reflected emitted light as well as the scattered emitted light into the light receiving surfaces is prevented easily, and at low cost.

This is because, for example, a metallic film that absorbs only blue light has a simpler film structure than a film that takes into consideration absorption of blue as well as red or green light. Therefore, this film can be formed at the area surrounding the light receiving surfaces easily and at low cost, compared to the conventional method. In addition, pigments and paints that absorb only blue light is lower in cost than pigments and paints that absorb blue as well as red or green light. Therefore, these materials can be easily utilized as the coating for the area surrounding the light receiving surfaces, compared to the conventional method.

DESCRIPTION OF THE PREFERRED EMBODIMENTS

Figure 1:
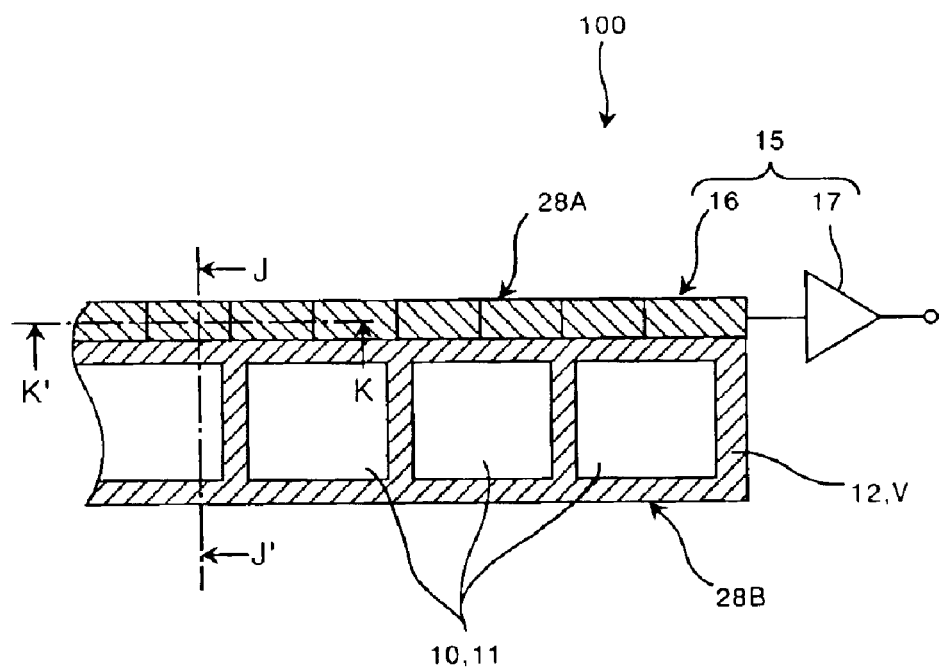
FIG. 1 is a planar view showing the structure of the image signal obtainment apparatus according to an embodiment of the present invention.

Hereinafter, an embodiment of the present invention will be described in detail with reference to the attached figures. FIG. 1 is a planar view showing the structure of the image signal obtainment apparatus that carries out the image signal obtainment method of the present invention, FIG. 2 is a sectional view taken along line j–j' of FIG. 1, and FIG. 3 is a sectional view taken along line K–K' of FIG. 1.

The image signal obtainment apparatus 100 according to the present embodiment comprises a plurality of photoelectric conversion elements 11 having light receiving surfaces 10 on the upper surfaces thereof for receiving emitted light generated by a stimulable phosphor sheet due so irradiation thereof with an excitation light (see FIG. 2); and an image signal obtainment means 15 for obtaining an electrical image signal based on the charges stored in the photoelectric conversion elements 11; wherein the area surrounding the light receiving surfaces 10 is covered by a filter that absorbs only blue light. The plurality of photoelectric conversion elements 11 having light receiving surfaces 10 on the upper surfaces thereof are arranged in a straight line within the image signal obtainment apparatus 100.

The image signal obtainment means 15 comprises a charge transfer path 16 and an output circuit 17. The charges stored in each of the photoelectric conversion elements by the reception of light by each of the light receiving surfaces thereof are transferred through the charge transfer path 16, and the transferred charges are converted into electric image signals and output by the output circuit 17.

Figure 2:
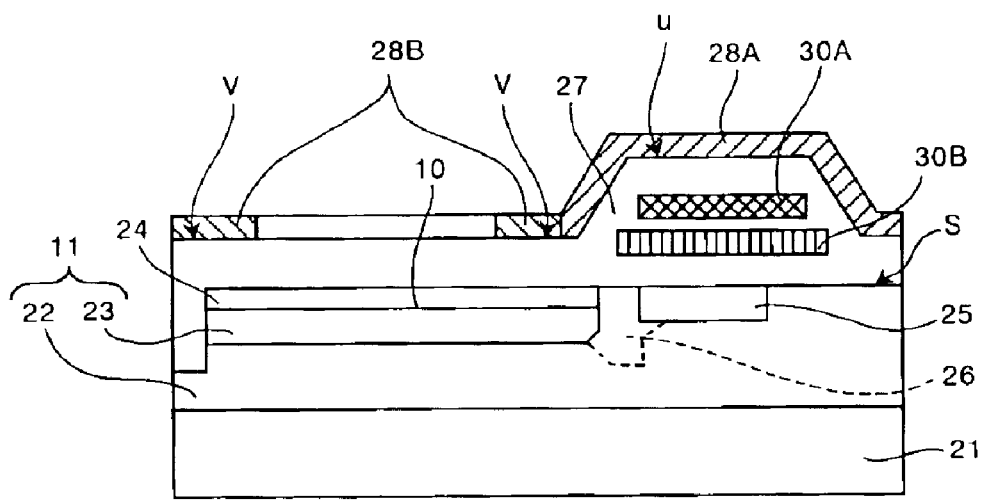
FIG. 2 is a sectional view taken along the line J—J' of FIG. 1.
Figure 3:
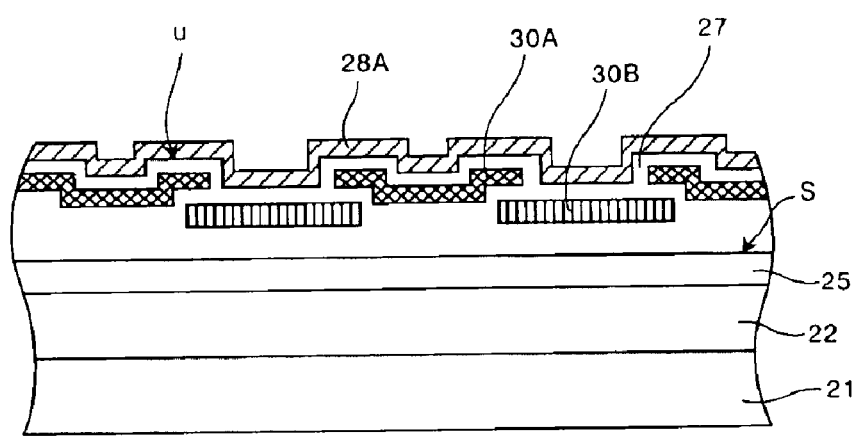
FIG. 3 is a sectional view taken along the line K—K' of FIG. 1.

As shown in the sectional view of FIG. 2, a P-type well layer 22 made of a low density P-type semiconductor layer is formed on an N-type semiconductor substrate 21. An N-type diffusion layer 23 is formed on the P-type well layer, and the photoelectric conversion element 11 is constituted by the pn junction of the P-type well layer 22 and the N-type diffusion layer 23. A high density transparent P-type diffusion layer 24 is formed on the N-type diffusion layer 23 that constitutes the photoelectric conversion element 11, to prevent dark current. A buried channel 25 of the N-type diffusion layer is formed in the well layer 22 next to the N-type diffusion layer 23. The channel 25 acts as a path through which the charges stored in the photoelectric conversion elements 11 are transferred to the output circuit 17, via the region of a high density P-type well layer 26.

A transparent insulative film 27 is formed on main surface S, at which the various diffusion layers have been formed. First transfer electrodes 30A and second transfer electrodes 30B are formed within this transparent insulative film 27. The second transfer electrodes 30B are positioned in a direction perpendicular to the main surface S, so that it partially overlaps the first transfer electrodes 30A. As shown in FIG. 3, which shows a sectional view taken along line K–K' of FIG. 1, the first transfer electrodes 30A and the second transfer electrodes 30B are arranged alternately so that they partially overlap each other along the buried channel 25, through which the charges are transferred. The charges stored in the photoelectric conversion elements 11 are transferred towards the output circuit 17 through the buried channel 25 by controlling the voltages of these transfer electrodes. Note that the first transfer electrode 30A also acts as the electrode that controls the motion of the charges stored in the photoelectric conversion elements 11 to the buried channel 25.

The charge transfer path 16 is constituted by the aforementioned first transfer electrodes 30A, second transfer electrodes 30B, buried channel 25, as well as the transparent insulative film 27 that fills in the gaps therebetween. The surface region U of the transparent insulative film 27 that constitutes the charge transfer path 16, and which is also a part of the area surrounding the light receiving surfaces 10, is covered by a filter 28A that absorbs only blue light.

Meanwhile, the surface region V of the transparent insulative film that constitutes the peripheral region 12 of each light receiving surface 10, which is a part of the area surrounding the light receiving surfaces 10, is covered by a filter 28B that absorbs only blue light. The filter 28B is formed at the peripheral edges of the light receiving openings, and is connected rectangularly.

Note that the filter 28A on surface region U and the filter 28B on surface region V are formed integrally in one manufacturing step.

As described above, by covering the surface region U of the charge transfer path and the surface region V of the peripheral region of the light receiving surfaces with a filter that absorbs only blue light, reflection and scattering of the emitted light at regions other than the light receiving surfaces can be prevented. Therefore, the generation of false images due to noise generated by the emitted light entering the light receiving surfaces can be prevented.

Note that filters 28A and 28B may be a metallic film that absorbs only blue light formed on the transparent insulative film 27, or it may be formed by coating the transparent insulative film 27 with pigment or paint that absorbs only blue light.

Further, the light receiving surfaces of the image signal obtainment apparatus described above may be arranged in a line or a matrix. There is no restriction as to the number or the manner of arrangement thereof.

Still further, the region covered by the filter that absorbs only blue light may be just the surface region of the charge transfer path, or just the surface region of the light receiving surface separation regions.

Note that in the embodiment described above, an example was given of an image signal obtainment apparatus comprising a charge transfer path. However, the entry of the reflected and scattered emitted light into the light receiving surfaces can be prevented easily and at low cost compared to conventional methods by covering the area surrounding the light receiving surfaces with a filter that absorbs only blue light, even in an image signal obtainment apparatus of a MOS-type, that does not have a charge transfer path.

In addition, in the embodiment described above, the area surrounding the light receiving surfaces (i.e., the surface region of the charge transfer path, the surface region of the light receiving surface separation regions) were covered by a filter that absorbs only blue light. However, a filter that absorbs only the emitted light may be used to cover these regions. It goes without saying that similar effects as those describe above can be obtained by using such a filter.

What is claimed is:

1. A method of image signal obtainment comprising the steps of:
    receiving an emitted light, said emitted light generated by a stimulable phosphor sheet due to irradiation thereof with an excitation light, at a plurality of light receiving surfaces of a plurality of photoelectric conversion elements; and
    obtaining electrical image signals based on a plurality of charges stored in said photoelectric conversion elements;
    wherein the area surrounding said light receiving surfaces are covered by a filter that absorbs only said emitted light.

2. The method of image signal obtainment as in claim 1, further wherein said filter comprises at least one of a metallic film, a pigment, or a paint.

3. The method of image signal obtainment as in claim 1, further wherein said light receiving surfaces are arranged in a matrix.

4. The method of image signal obtainment as in claim 1, further wherein said filter only covers a charge transfer path of said photoelectric conversion elements.

5. The method of image signal obtainment as in claim 1, further wherein said area surrounding said light reception areas comprises an area peripherally adjacent to said light reception areas.

6. A method of image signal obtainment comprising the steps of:
    receiving an emitted light, said emitted light generated by a stimulable phosphor sheet due to irradiation thereof with an excitation light, at a plurality of light receiving surfaces of a plurality of photoelectric conversion elements; and
    obtaining electrical image signals based on a plurality of charges stored in said photoelectric conversion elements;
    wherein the area surrounding said light receiving surfaces are covered by a filter that absorbs only blue light.

7. The method of image signal obtainment as in claim 6, further wherein said filter comprises at least one of a metallic film, a pigment, or a paint.

8. The method of image signal obtainment as in claim 6, further wherein said light receiving surfaces are arranged in a matrix.

9. The method of image signal obtainment as in claim 6, further wherein said filter only covers a charge transfer path of said photoelectric conversion elements.

10. The method of image signal obtainment as in claim 6, further wherein said area surrounding said light reception areas comprises an area peripherally adjacent to said light reception areas.

11. An apparatus for image signal obtainment comprising:
    a plurality of photoelectric conversion elements having a plurality of light receiving surfaces for receiving an emitted light generated by a stimulable phosphor sheet due to irradiation thereof with an excitation light; and
    an image signal obtainment means for obtaining a plurality of electrical image signals based on a plurality of charges stored in said photoelectric conversion elements;
    wherein the area surrounding said light receiving surfaces are covered by a filter that absorbs only said emitted light.

12. An apparatus for image signal obtainment according to claim 11, comprising a plurality of photoelectric conversion elements,
    wherein said light receiving surfaces of each of said photoelectric conversion elements are arranged in a straight line.

13. The apparatus for image signal obtainment of claim 11, further wherein said filter comprises at least one of a metallic film, a pigment, or a paint.

14. The apparatus for image signal obtainment of claim 11, further wherein said light receiving surfaces are arranged in a matrix.

15. A The apparatus for image signal obtainment of claim 11, further wherein said filter only covers a charge transfer path of said photoelectric conversion elements.

16. The apparatus for image signal obtainment of claim 11, further wherein said area surrounding said light reception areas comprises an area peripherally adjacent to said light reception areas.

17. An apparatus for image signal obtainment comprising:
    a plurality of photoelectric conversion elements having a plurality of light receiving surfaces for receiving an emitted light generated by a stimulable phosphor sheet due to irradiation thereof with an excitation light; and
    an image signal obtainment means for obtaining a plurality of electrical image signals based on a plurality of charges stored in said photoelectric conversion elements;
    wherein the area surrounding said light receiving surfaces are covered by a filter that absorbs only blue light.

18. An apparatus for image signal obtainment according to claim 17, comprising a plurality of photoelectric conversion elements, wherein said light receiving surfaces of each of said photoelectric conversion elements are arranged in a straight line.

19. The apparatus for image signal obtainment of claim 17, further wherein said filter comprises at least one of a metallic film, a pigment, or a paint.

20. The apparatus for image signal obtainment of claim 17, further wherein said light receiving surfaces are arranged in a matrix.

21. The apparatus for image signal obtainment of claim 17, further wherein said filter only covers a charge transfer path of said photoelectric conversion elements.

22. The apparatus for image signal obtainment of claim 17, further wherein said area surrounding said light reception areas comprises an area peripherally adjacent to said light reception areas.

* * * * *